United States Patent [19]

Hirose et al.

[11] Patent Number: 4,729,927
[45] Date of Patent: Mar. 8, 1988

[54] POLYESTER PACKAGING MATERIAL

[75] Inventors: Masahiko Hirose; Takatoshi Kuratsuji; Toshihiro Santa, all of Matsuyama, Japan

[73] Assignee: Teijin Limited, Osaka, Japan

[21] Appl. No.: 800,454

[22] Filed: Nov. 21, 1985

[30] Foreign Application Priority Data

Nov. 22, 1984 [JP] Japan .................. 59-245885
Feb. 5, 1985 [JP] Japan .................. 60-19241

[51] Int. Cl.$^4$ .............. B32B 27/08; B32B 27/36; C08L 67/02; C08L 67/04
[52] U.S. Cl. .................. 428/480; 428/911; 525/444; 525/933; 528/302
[58] Field of Search ............. 525/444, 933; 528/302; 428/480, 911

[56] References Cited

U.S. PATENT DOCUMENTS

| | | | |
|---|---|---|---|
| 4,388,456 | 6/1983 | Barbee | 528/289 |
| 4,403,090 | 9/1983 | Smith | 528/272 |
| 4,424,242 | 1/1984 | Barbee | 428/35 |
| 4,482,586 | 11/1984 | Smith | 428/35 |
| 4,578,295 | 3/1986 | Jabarin | 428/35 |
| 4,578,437 | 3/1986 | Light | 525/444 |

FOREIGN PATENT DOCUMENTS

| | | |
|---|---|---|
| 0105825 | 4/1984 | European Pat. Off. . |
| 0105826 | 4/1984 | European Pat. Off. . |
| 59-039547 | 3/1984 | Japan . |
| 0039547 | 3/1984 | Japan . |
| 59-196316 | 11/1984 | Japan . |
| 0196316 | 11/1984 | Japan . |
| 1507876 | 4/1978 | United Kingdom . |

*Primary Examiner*—Patricia A. Short
*Attorney, Agent, or Firm*—Burgess, Ryan & Wayne

[57] ABSTRACT

A packaging polyester material comprising a polyethylene terephthalate component and a component of polyethylene isophthalate copolymerized with 5 to 60 mole % of an aliphatic hydroxycarboxylic acid having up to 8 carbon atoms. This packaging material is excellent in the resistance to the permeation of gases.

9 Claims, No Drawings

POLYESTER PACKAGING MATERIAL

BACKGROUND OF THE INVENTION

1. Field of the Invention

The present invention relates to a polyester packaging material. More particularly, the present invention relates to a polyester packaging material with excellent gas barrier properties, the mechanical strength and transparency.

2. Description of the Related Art

Polyethylene terephthalate has excellent mechanical and chemical properties and therefore, it is widely used for the production of fibers, films and industrial resins, and recently, polyethylene terephthalate is used for the production of various vessels such as bottles, cups and trays. In this application field, in view of the storage of the contents, a high gas barrier property is required. Polyethylene terephthalate is excellent in the gas barrier property over polyolefin resins such as polyethylene, but as compared with the gas barrier property of glass or aluminum, the gas barrier property of polyethylene terephthalate is still insufficient.

Investigations have been made for improving the gas barrier property of polyethylene terephthalate, and various methods have been proposed. For example, there have been proposed a method in which a polyester is coated or laminated with a gas barrier material such as polyvinylidene chloride or a saponified ethylene/vinyl acetate copolymer (see Japanese Unexamined Patent Publications No. 54-117565 and No. 56-64839), a method in which a polyester is blended with a gas barrier material (see Japanese Unexamined Patent Publication No. 57-10640 and No. 59-196316 and European Patent Application Publication No. 0105825) and a method in which the gas barrier property is improved by increasing the orientation degree of a polyester shaped article (see Japanese Unexamined Patent Publication No. 56-151648). In the method of increasing the orientation degree, however, the improvement of the gas barrier property is limited, and the method using a gas barrier material involves problems as regards recovery and re-utilization of the used articles. In the method in which a polyester is coated or laminated with a gas barrier material, since a resin different from the polyester is used, the adhesion of the resin to the polyester is poor and interlaminar peeling or reduction of the transparency occurs. Moreover, the method is disadvantageous in recovery of the used material. When polyethylene terephthalate is laminated or coated with polyethylene isophthalate, (see Japanese Unexamined Patent Publication No. 59-39547 and European Patent Application Publication No. 0105825), because of the brittleness of polyethylene isophthalate per se, the laminated or coated structure is brittle and in order to obtain a strength required for a vessel, the thickness of the polyethylene terephthalate layer should be increased to a level corresponding to the thickness of a vessel composed solely of a polyethylene terephthalate layer, and therefore, the weight of the vessel as a whole is increased and a light weight characteristic, which is one of merits of synthetic resin vessels, is lost. Furthermore, the gas barrier property is poor. In the case of a vessel, since the heat resistance of a polyethylene terephthalate packing material laminated with a polyglycolic acid (see U.S. Pat. No. 4,424,242) is poor, it is difficult to obtain a molded article having a satisfactory mechanical strength under molding conditions for polyethylene terephthalate. Further, a polyester packing material of polyalkylene isophthalate copolymerized with an aliphatic dicarboxylic acid having 4 to 12 carbon atoms are proposed (see U.S. Pat. No. 4,403,090). However, this material does not have a satisfactorily improved gas barrier property.

SUMMARY OF THE INVENTION

It is a primary object of the present invention to provide a polyester packaging material which has excellent mechanical strength, transparency and gas barrier properties.

More specifically, in accordance with the present invention, there is provided a polyester packaging material excellent in the resistance to the permeation of gases, which comprises a polyethylene terephthalate component and a component of polyethylene isophthalate copolymerized with 5 to 60 mole% of an aliphatic hydroxycarboxylic acid having up to 8 carbon atoms.

DESCRIPTION OF THE PREFERRED EMBODIMENTS

By the term "polyethylene terephthalate" used in the present invention is meant a polyester comprising terephthalic acid as the main carboxylic acid component and ethylene glycol as the glycol component. The polyethylene terephthalate may be copolymerized with other acid component and/or other glycol component, so far as the characteristic properties are not degraded. Moreover, the polyethylene terephthalate may be copolymerized with a polyfunctional compound such as trimellitic acid or pentaerythritol or a monofunctional compound such as benzoic acid, so far as the molecule is substantially linear.

This polyethylene terephthalate is prepared in the same manner as adopted for the production of ordinary polyethylene terephthalate. When the polyester packaging material is used for packaging foods, germanium oxide is preferable to antimony trioxide as the polymerization catalyst from the viewpoint of the sanitary safety. However, any of catalysts capable of satisfying the requirements described in "Positive List" of the Conference of Sanitary Safety of Polyolefins and the Like may be used.

In view of the physical properties such as the mechanical strength, a higher intrinsic viscosity is preferred for polyethylene terephthalate. Specifically, it is preferred that the intrinsic viscosity of polyethylene terephthalate be 0.5 to 1.5, especially at least 0.6.

Copolymerized polyethylene isophthalate valuably used for the packaging material of the present invention comprises 40 to 95 mole% of ethylene isophthalate units and 5 to 60 mole% of units of an aliphatic hydroxycarboxylic acid having up to 8 carbon atoms. It has been unexpectedly found that by copolymerizing polyethylene isophthalate with this aliphatic hydroxycarboxylic acid, the gas barrier property is greatly improved.

If the copolymerization ratio of the aliphatic hydroxy carboxylic acid is lower than 5 mole%, the brittleness owing to isophthalic acid becomes prominent and strength of the obtained packaging material is often insufficient. If the copolymerization ratio of the aliphatic hydroxycarboxylic acid exceeds 60 mole%, the thermal stability at the molding step and the physical properties, especially the mechanical strength, of the molded article are degraded. It is preferred that the copolymerization ratio of the aliphatic hydroxycarboxylic acid be 10 to 50 mole%.

As the aliphatic hydroxycarboxylic acid having up to 8 carbon atoms, there can be mentioned glycolic acid, 3-hydroxypropionic acid, 4-hydroxybutyric acid, 5-hydroxyvaleric acid, 6-hydroxycaproic acid, 7-hydroxyenanthic acid and 8-hydroxycaprylic acid. Functional derivatives of these aliphatic hydroxycarboxylic acids, for example, lower alkyl esters and lactones formed by cyclization by intramolecular dehydration (such as $\beta$-propiolactone, $\gamma$-butyrolactone, $\delta$-valerolactone and $\epsilon$-caprolactone) can also be used. Among these compounds, glycolic acid is most preferred.

It is preferred that the intrinsic viscosity of the copolymerized polyethylene isophthalate be 0.3 to 1,5, especially at least 0.4, particularly especially at least 0.45.

The copolymerized polyethylene isophthalate may comprise other comonomer component, so far as the characteristic properties are not degraded. Moreover, a polyfunctional compound such as glycerol, trimethylolpropane, pentaerythritol, trimellitic acid, trimesic acid, pyromellitic acid or tricarballylic acid or a monofunctional compound such as o-benzoylbenzoic acid or naphthoic acid may be bonded to the copolymerized polyethylene isophthalate, so far as the polymer is substantially linear. When a polyfunctional compound is copolymerized in an amount of preferably 0.1 to 0.5 mole%, the creep resistance of the obtained molded article is improved.

The copolymerized polyethylene isophthalate may be prepared in the same manner as adopted for the production of polyethylene terephthalate. For example, the copolymerized polyethylene isophthalate is prepared by esterification reaction of isophthalic acid, an aliphatic hydroxycarboxylic acid and ethylene glycol or ester exchange reaction of a lower alkyl ester (for example, a dimethyl ester) of isophthalic acid, a functional derivative (for example, a lower alkyl ester or lactone) of an aliphatic hydroxycarboxylic acid and ethylene glycol and subsequent polycondensation of the reaction product. Furthermore, the above-mentioned method may be modified so that the aliphatic hydroxycarboxylic acid or its functional derivative is added just before initiation of the polycondensation reaction. It is preferable to use an esterifying catalyst, an ester exchange catalyst, a polycondensation catalyst and a heat stabilizer for the production of the copolymerized polyethylene isophthalate. Substances known as catalysts and stabilizers for the production of polyesters, especially polyethylene isophthalate, may be used as the catalysts and stabilizers. Other additives such as colorants, fluorescent whitening agents, antioxidants, ultraviolet ray absorbents, antistatic agents and flame retardants may be used according to need.

A phosphorus compound is preferably used as the heat stabilizer, and it is preferred that the phosphorus compound be incorporated in an amount of 50 to 150 millimole% phosphorus based on the acid or glycol units. Furthermore, it is preferred that the antioxidant be used in an amount of 0.1 to 1% by weight based on the copolymerized polyethylene isophthalate.

The packaging material of the present invention may have a multi-layer structure comprising a layer of the polyethylene terephthalate component and a layer of the copolymerized polyethylene isophthalate component or an integral structure of a blend of the two components. In the copolymerized polyethylene isophthalate component of the packaging polyester material of the present invention, it is preferred that the units of aliphatic hydroxycarboxylic acid be present in an amount of 3 to 25 mole%, especially 5 to 20 mole%, based on the total polyester units.

In the case where the polyester packaging material of the present invention comprises multiple layers, the layer structure or the number of the layers is not particularly critical. However, it is practically preferred that the number of the layers be up to 5, preferably up to 3. It is ordinarily preferred that the polyethylene terephthalate component be present as the innermost layer of the packaging material, and in case of a three-layer structure, the copolymerized polyethylene isophthalate component is preferably formed as the intermediate layer.

As the packaging material of the present invention, there can be mentioned a vessel formed by the molding method including the drawing step, such as a bottle or cup. Furthermore, the packaging material may be a vessel formed by deep-draw-molding of a sheet or a vessel formed by drawing a bottomed pipe. Moreover, a tray obtained by vacuum forming or air pressure forming of a sheet is included. Various methods may be adopted for the production of these packaging materials. For example, in case of a bottle, there may be adopted a known extrusion blow-molding method and a biaxial orientation-blow-molding method, but the latter biaxial orientation-blow-molding method is advantageous. According to the biaxial orientation-blow-molding method, an article having an expandable geometrical shape, that is, a vessel preform, is heated at a drawing temperature and is then drawn in a blow mold by a drawing rod moving in the axial direction and by blowing of a compressed gas, or a pipe-shaped preform moving in the axial direction is heated at a drawing temperature and is provided with a sealed bottom and drawn in a blow mold to a shape of a bottle by utilizing the difference between the feed speed and the withdrawal speed and blowing of a compressed gas.

A vessel preform having a multi-layer structure may be prepared, for example, by forming an inner layer and subsequent layers in sequence by using an ordinary injection molding machine or a molding machine provided with a plurality of melt injection devices, or by injection continuously and alternately molten polyethylene terephthalate and copolymerized polyethylene isophthalate in a simple mold by one mold clamping operation by using a molding machine having a plurality of injection cylinders so that the first injected polyethylene terephthalate forms inner and outer surface layers and the subsequently or simultaneously injected copolymerized polyethylene isophthalate forms and intermediate layer. Furthermore, the vessel preform may be formed by bottoming one end of a multilayer pipe formed by a multi-layer extrusion molding machine.

Heating of the vessel preform or the multi-layer pipe-shaped preform may be accomplished by using an ordinary heating oven provided with an ordinary heater such as a block heater or an infrared ray heater.

In the case where the packaging material is prepared from the blend, it is preferred that both the components be melt-kneaded by an extruder to obtain a mixture pellet prior to the production of a vessel preform and the mixture pellet be used for molding. Moreover, there may be adopted a method in which both the components are independently granulated, these granules are dry-blended and the resulting blend is directly used for molding.

The polyester packaging material of the present invention is excellent in the resistance to the permeation of gases and also in physical properties such as mechanical strength and transparency. Moreover, when the packaging material has a multi-layer structure, the packaging material is characterized in that interlaminar peeling does not occur.

The present invention will now be described in detail with reference to the following examples. The physical properties mentioned in the examples are those determined according to the following methods.

(a) Intrinsic viscosity [η] of polymer

The intrinsic viscosity was calculated from the solution viscosity of a solution of the polymer in o-chlorophenol measured at 35° C.

(b) Strength of bottle against falling shock

A bottle was charged with 1000 g of water and 14 g of citric acid. Then, 14 g of sodium bicarbonate weighed in a polyethylene bag was inserted in the mouth portion of the bottle so that sodium bicarbonate was not directly contacted with the aqueous solution of citric acid in the bottle, and immediately, the bottle was plugged with an aluminum cap. Then, the bottle was shaken so that sodium bicarbonate was sufficiently mixed with the aqueous solution of citric acid, whereby $CO_2$ was generated and a state where an aqueous solution having $CO_2$ dissolved under pressure was in the bottle. Then the aqueous $CO_2$-containing liquid-filled bottle was maintained at 5° C. for 24 hours and the bottle was dropped onto a concrete floor from a height of 1.0 m so that the bottom struck the floor. The ratio of the number of broken bottles to the number of all the tested bottles was calculated.

(c) $CO_2$ barrier property of bottle

In the same manner as described in (b) above, $CO_2$ was dissolved under pressure in water in a sample bottle in an amount of 4 times the volume of the bottle, and the aqueous $CO_2$-containing liquid-filled bottle was maintained in an atmosphere of predetermined temperature and humidity for a predetermined time. Then, the filled bottle was transferred into an atmosphere maintained at 20° C. and the $CO_2$ pressure in the bottle was measured in the state where the temperature of the liquid was 20° C., and the volume of residual $CO_2$ was calculated by the formula of $CO_2$ Volume $= VCO_2/VH_2O$ (in which $VH_2O$ stands for the volume of water in the bottle, and $VCO_2$ stands for the volume calculated as gas, of $CO_2$ dissolved in water in the bottle under 1 atmosphere).

EXAMPLES 1 THROUGH 4

Polyester A

A reaction vessel was charged with 35 parts by weight of dimethyl terephthalate, 22.4 parts by weight of ethylene glycol and 0.002 part by weight of tetrabutyl titanate, and the mixture was heated at 150° to 240° C. When 11.5 parts by weight of methanol was distilled off, 0.005 part by weight of phosphorous acid and 0.0045 part by weight of germanium dioxide were added to the reaction mixture and the temperature was elevated to 250° to 280° C. The pressure was gradually reduced and reaction was carried out under 1 mmHg for 60 minutes to obtain a polymer having an intrinsic viscosity [η] of 0.65. The polymer was subjected to the solid phase polymerization at 210° C. in a nitrogen current to obtain polyethylene terephthalate having an intrinsic viscosity [η] of 0.75. This polyethylene terephthalate is designated as "polyester A".

Polyester B

A reaction vessel was charged with 17.5 parts by weight of dimethyl isophthalate, 6.86 parts by weight of glycolic acid, 11.2 parts by weight of ethylene glycol and 0.002 part by weight of tetrabutyl titanate, and the mixture was heated at 150° to 220° C. When methanol and water were distilled off, 0.005 part by weight of phosphorous acid and 0.0045 part by weight of germanium dioxide were added to the reaction mixture, and the temperature was elevated to 240° to 260° C. and the pressure was gradually reduced. Reaction was carried out under 1 mmHg for 90 minutes to obtain a polymer having an intrinsic viscosity [η] of 0.74. This polymer is designated as "polyester B".

Formation of Multi-Layer Structure

In a three-layer injection molding machine having two cylinder portions, one of which was intruded into the other cylinder portions, the polyester A (dried at 160° C. for 5 hours by hot air) at a cylinder temperature of 270° to 280° C. and the polyester B (vacuum-dried at 50° C. for 24 hours) at a cylinder temperature of 200° to 220° C. were co-injected so that the polyester B was intruded into the polyester A. The ratio between the polyesters A and B was changed as shown in Table 1 by adjusting the injection quantities of the polyesters A and B, and the mold temperature was maintained at 10° C. Thus, there was obtained a one-end-bottomed cylindrical preform having a three-layer structure comprising inner and outer layers of the polyester A and an intermediate layer of the polyester B, in which the outer diameter of the barrel portion was 25 to 26 mm, the thickness was 3.5 mm and the total length was 155 mm.

The preform was blow-formed at a preform temperature of 100° to 130° C. in a biaxial orientation-blow-molding machine to obtain a bottle having a barrel portion outer diameter of 82 mm, a total height of 280 mm, a barrel portion thickness of 320 to 380 μm and an inner volume of 1040 to 1050 ml.

The falling impact strength and carbon dioxide gas barrier property of the obtained multi-layered polyester bottle were determined. The obtained results are shown in Table 1.

The reason why the residual amount of $CO_2$ was reduced in Examples 3 and 4 inspite of increase of the amount of the hydroxycarboxylic acid in the bottle is that the bottle volume was increased by creeping.

EXAMPLES 5 AND 6

A biaxially drawn bottle was prepared in the same manner as in Example 3 except that the ratio of glycolic acid in the polyester B was changed as shown in Table 1 and the ratio of the polyester B in the bottle was changed to 30% by weight. The physical properties of the bottle are shown in Table 1.

EXAMPLES 7 TRHOUGH 9

A biaxially drawn multi-layered bottle was prepared in the same manner as described in Example 3 except that the amount of phosphorous acid added after the ester exchange reaction in the production of the polyester B was changed to 0.0148 part by weight (100 millimole% based on the total acid components), or 0.2% by weight of pentaerythritol tetrakis [3-(3,5-di-t-butyl-4-hydroxyphenyl)propionate] was added to the polyester B, or 0.069 part by weight of trimellitic anhydride (0.2 mole% based on the total acid components) was added to the polyester B at the start of the reaction. The physical properties of the obtained bottle are shown in Table 1.

In the former two cases, the falling impact strength of the bottle was increased because the heat stability of the polyester B was increased, and in the last-mentioned case, the creep resistance was improved and the amount of residual $CO_2$ was increased.

EXAMPLES 16 THROUGH 18

The same polyesters A and B as used in Example 1 were independently dried and blended at a predetermined ratio, and a preform having the same shape as that of the preform prepared in Example 1 was prepared at a cylinder temperature of 260° to 270° C. and a mold temperature of 10° C. from this blend in a monoaxial

TABLE 1

| | Content (mole %) of Hydroxycarboxylic Acid in Polyester B | Lamination Ratio (% by weight) of Polyester in Bottle | Content (mole %) of Hydroxycarboxylic Acid in Bottle | Physical Properties of Bottle | | |
|---|---|---|---|---|---|---|
| | | | | Falling Impact Strength, Break Ratio (%) | $CO_2$ Barrier Property (15° C. × 30% RH × 120 days) | Residual $CO_2$ (volume) (35° C. × 80% RH × 120 days) |
| Example 1 | 50 | 20 | 10 | 0 | 3.70 | 3.45 |
| Example 2 | 50 | 10 | 5 | 0 | 3.60 | 3.40 |
| Example 3 | 50 | 30 | 15 | 5 | 3.60 | 3.40 |
| Example 4 | 50 | 40 | 20 | 10 | 3.55 | 3.30 |
| Example 5 | 17 | 30 | 5 | 5 | 3.55 | 3.35 |
| Example 6 | 30 | 30 | 9 | 5 | 3.65 | 3.40 |
| Example 7 | 50 | 30 | 15 | 0 | 3.60 | 3.40 |
| Example 8 | 50 | 30 | 15 | 0 | 3.60 | 3.40 |
| Example 9 | 50 | 30 | 15 | 5 | 3.65 | 3.50 |
| Comparative Example 1 | 0 (single layer of PET) | 0 | 0 | 0 | 3.43 | 3.16 |

Note
[1]The falling impact strength was practically sufficient if the break ratio was not higher than 10%.
[2]The $CO_2$ barrier property was practically sufficient if it was at a least 3.55 under conditions of 15° C. × 30% RH × 120 days and at least 3.30 under conditions of 35° C. × 80% RH × 120 days.

EXAMPLES 10 THROUGH 15 AND COMPARATIVE EXAMPLES 2 AND 3

A biaxially drawn bottle was prepared in the same manner as described in Example 1 except that in the production of the polyester B, a hydroxycarboxylic acid shown in Table 2 was used in a predetermined amount. The properties of the obtained bottle are shown in Table 2.

It is seen that when an aromatic hydroxycarboxylic acid is used, no substantial effect can be attained.

single-layer injection molding machine. A blown bottle was formed from the preform by biaxial-draw-blowing in the same manner as described in Example 1. The properties of the obtained bottle are shown in Table 3.

TABLE 3

| Example No. | Content (mole %) of Glycolic Acid in Polyester B | Ratio (% by weight) of Polyester B in Bottle | Content (mole %) of Hydroxycarboxylic Acid in Bottle | Physical Properties of Bottle | | |
|---|---|---|---|---|---|---|
| | | | | Falling Impact Strength, Break Ratio (%) | $CO_2$ Barrier Property (15° C. × 30% RH × 120 days) | Residual $CO_2$ (volume) (35° C. × 80% RH × 120 days) |
| 16 | 50 | 10 | 5 | 0 | 3.55 | 3.35 |
| 17 | 50 | 20 | 10 | 0 | 3.65 | 3.40 |
| 18 | 50 | 30 | 15 | 5 | 3.55 | 3.35 |

We claim:
1. A polyester packaging material having excellent resistance to the permeation of gases, said material comprised of a polyethylene terephthalate component and a component of polyethylene isophthalate copolymerized with 5 to 60 mole% of an aliphatic hydroxycarboxylic acid having up to 8 carbon atoms and wherein the copolymerized polyethylene isophthalate component is pres-

TABLE 2

| | Polyester B | | Ratio (% by weight) of Polyester B in Bottle | Content (mole % of Hydroxycarboxylic Acid in Bottle | Physical Properties of Bottle | |
|---|---|---|---|---|---|---|
| | Hydroxycarboxylic Acid | Ratio (mole %) | | | Falling Impact Strength, Break Ratio (%) | Residual $CO_2$ (volume) (35° C. × 80% RH × 120 days) |
| Example 10 | 3-hydroxypropionic acid | 50 | 20 | 10 | 0 | 3.40 |
| Example 11 | 4-hydroxybutyric acid | 50 | 20 | 10 | 0 | 3.40 |
| Example 12 | 5-hydroxyvaleric acid | 50 | 20 | 10 | 0 | 3.35 |
| Example 13 | 6-hydroxycaproic acid | 50 | 20 | 10 | 5 | 3.35 |
| Example 14 | 7-hydroxyenanthic acid | 50 | 20 | 10 | 5 | 3.30 |
| Example 15 | 8-hydroxycaprylic acid | 50 | 20 | 10 | 5 | 3.30 |
| Comparative Example 2 | p-hydroxybenzoic acid | 50 | 20 | 10 | 5 | 3.20 |
| Comparative Example 3 | p-hydroxyethoxybenzoic acid | 50 | 20 | 10 | 5 | 3.18 | ent in such an amount that the content of the units of the aliphatic hydroxycarboxylic acid is 3 to 25 mole% based on the total polyester.

2. A packaging material as set forth in claim 1, wherein the polyethylene terephthalate component and the copolymerized polyethylene isophthalate component are formed into a multi-layer structure.

3. A packaging material as set forth in claim 1, wherein the polyethylene terephthalate component and the copolymerized polyethylene isophthalate component are blended and formed into an integral structure.

4. A packaging material as set forth in claim 1, wherein the content of the units of the aliphatic hydroxycarboxylic acid is 5 to 20 mole% based on the total polyester.

5. A packaging material as set forth in claim 1, wherein the aliphatic hydroxycarboxylic acid is selected from glycolic acid, 3-hydroxypropionic acid, 4-hydroxybutyric acid, 5-hydroxyvaleric acid, 6-hydroxycaproic acid, 7-hydroxyenanthic acid, 8-hydroxycarprylic acid and functional derivatives thereof.

6. A packaging material as set forth in claim 5, wherein the aliphatic hydroxycarboxylic acid is glycolic acid.

7. A packaging material as set forth in claim 1, wherein the copolymerization ratio of the aliphatic hydroxycarboxylic acid is 10 to 50 mole%.

8. A packaging material as set forth in claim 1, wherein the intrinsic viscosity of the polyethylene terephthalate component is 0.5 to 1.5.

9. A packaging material as set forth in claim 1, wherein the intrinsic viscosity of the polyethylene isophthalate component is 0.3 to 1.5.

* * * * *